O. C. SCHMIDT.
MEAT CUTTING MACHINE.
APPLICATION FILED AUG. 23, 1916.
1,253,892.
Patented Jan. 15, 1918.
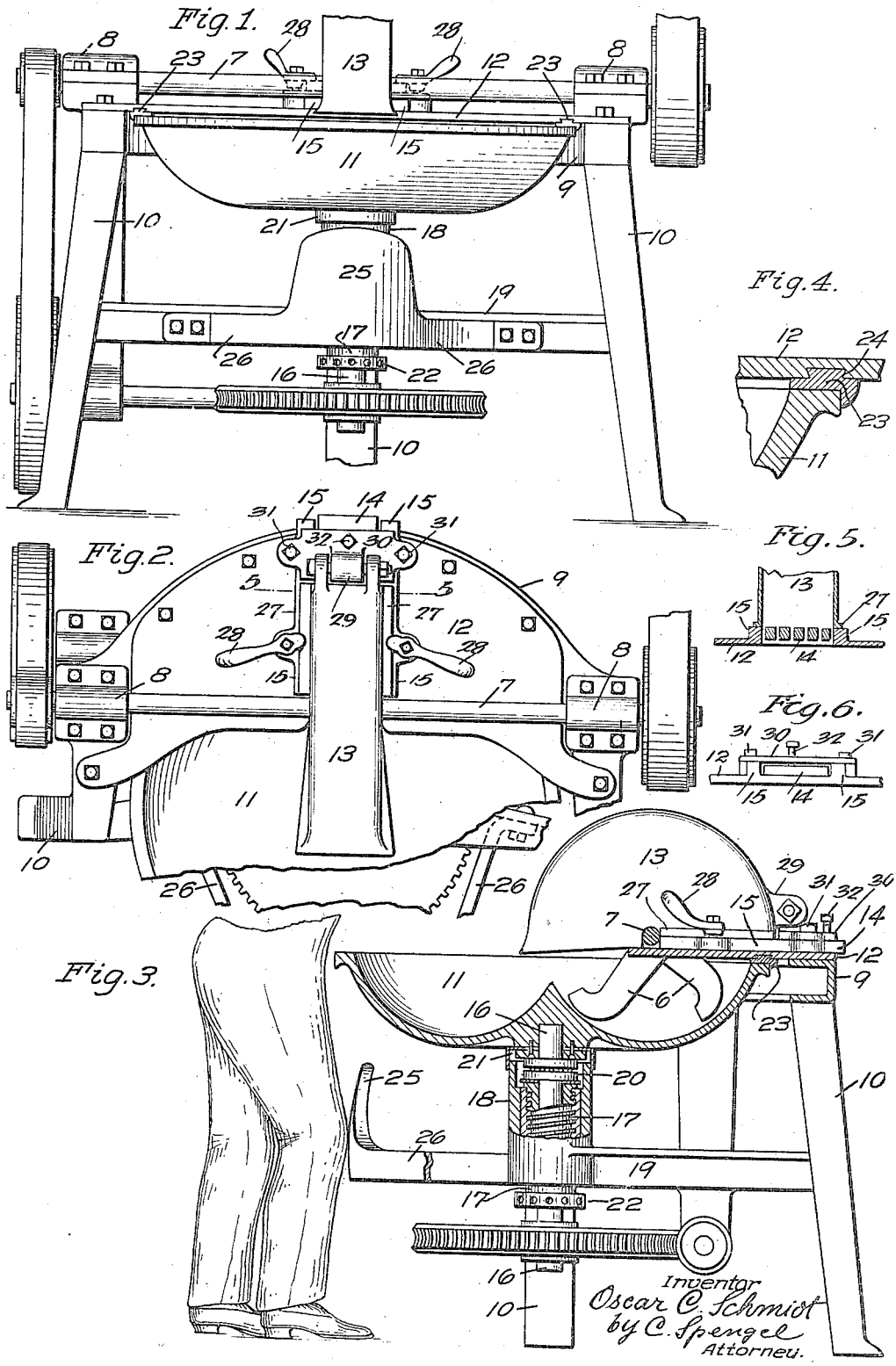

UNITED STATES PATENT OFFICE.

OSCAR C. SCHMIDT, OF CINCINNATI, OHIO, ASSIGNOR TO THE CINCINNATI BUTCHERS SUPPLY COMPANY, OF CINCINNATI, OHIO, A CORPORATION OF OHIO.

MEAT-CUTTING MACHINE.

1,253,892.  Specification of Letters Patent.  Patented Jan. 15, 1918.

Application filed August 23, 1916. Serial No. 116,534.

*To all whom it may concern:*

Be it known that I, OSCAR C. SCHMIDT, residing at Cincinnati, Hamilton county, State of Ohio, have invented certain new and useful Improvements in Meat-Cutting Machines, of which the following is a clear, full, and exact description, attention being called to the drawing which accompanies this application and forms a part thereof.

This invention concerns a type of meat-cutting machines in which the meat is cut or minced by a cutter-head which rotates in a vertical plane and is positioned in a horizontally supported bowl which serves to hold the meat.

The bowl also rotates so as to subject all the meat contained therein to the action of the cutter-head. The meat is reduced between the knives of the cutter-head and the bottom of the bowl.

A frame is provided which supports the bowl and the cutter-head and also the means for actuating them.

One of the features of my invention is a construction of such machines whereby leakage of meat out of the bowl over the edge thereof is prevented.

Other parts of the invention relate to features of adjustment and concern also the operation of the machine which is rendered more secure and convenient for the operator.

The invention consists of improvements in the construction of the machine which embody these features and as described hereinafter and pointed out in the claims.

In the drawing forming a part of this description—

Figure 1 is a front view of the machine.

Fig. 2 is part of a top view of the same.

Fig. 3 is a vertical section of it and

Fig. 4 in an enlarged section shows a detail of construction.

Fig. 5 is a cross-section through portions of Fig. 2 and taken on line 5—5 of said figure. Fig. 6 is a rear-end view of these parts.

The cutter-head consists of a number of knives 6 mounted with a space between them upon a shaft 7. This shaft revolves in bearings 8—8 seated upon a segmental frame 9. Legs 10 are provided for this frame, one under each of its ends and near the shaft bearings.

Numeral 11 indicates the circular bowl below the cutter-head shaped transversely as shown to conform to the rotary path of the free ends of the knives which pass close to the inner surface of the bowl.

Frame 9 surrounds the bowl merely sufficiently to receive the shaft bearings and to take in the legs near them, extending from one of them to the other around the rear side of the bowl. This leaves the front part of the bowl free for convenient access by the operator while manipulating the machine.

The rear part of the bowl on both sides of the cutter head and below shaft 7 is closed by a cover 12 which consists of a flat plate and is secured to frame 9.

This cover also supports a hood 13 which incloses that part of the rotating cutter head which moves above the cover. That part of the cover which is below the hood is cut out to make an opening to clear the rotating cutter head.

It further supports a comb 14 which extends into this opening and against which the knives cut while passing through it. See Fig. 5.

This comb is positioned between two shoulders 15—15 on the upper side of the cover and extends across the opening in the same and along the edges of the opening in the same up to a point where shaft 7 crosses the cover. The edges of the hood as far as they are supported are provided with flanges 27—27 which rest upon these shoulders 15—15, being held down by pivotally connected locking handles 28—28. When these handles are moved to release flanges 27—27, hood 13 may be raised up to give access to the cutter head, the hood swinging then on a hinge 29 whereby it is held in position by means of a cap 30 which, also resting on shoulders 15—15, extends across comb 14 between them and is held to cover 12 by means of screws 31—31. A set-screw 32 seated in this cap holds comb 14 in position and when said screw is loosened comb 14 may be moved out rearwardly for cleaning for instance. When so moved out, or when re-inserted it slides between shoulders 15—15 whereby it is guided. See Fig. 6. It is essential that the underside of the cover and the top-edge of the bowl closely meet to prevent lodgment and leakage of meat between the two, so as to keep the machine in clean and sanitary condition.

Furthermore, to maintain this relation between the two, the bowl is arranged to be vertically adjustable so that in case wear causes it to settle away from the underside of the cover it may be restored to proper position.

For such purpose an upright shaft 16, is connected at its upper end to the underside of the bowl for rotating it and finds a bearing in an upright sleeve 17 adjustably fitted to a bearing 18 which forms part of a frame 19 transversely extending between the legs of the machine and connected to them.

The bowl with its shaft 16 rests upon the upper end of the adjustable sleeve, a ball bearing 20 being interposed which is protected by a dust-cap 21.

Sleeve 17 is screw-connected to bearing 18 and provided with a flange 22 to permit manipulation by means of a suitable implement. The screw thread in bearing 18 is formed by Babbitt metal.

The two shafts of the machine, the cutter-head shaft and the bowl-shaft may be driven in any approved manner as shown for instance in the drawing.

The close fit between the underside of the cover and the top-edge of the bowl is best obtained by means of a running contact as to the bowl and a soft metal bearing 23, preferably babbitt, is provided on the underside of the cover in which the corner at the circular edge of the bowl travels and presents an angular recess to the corner of the bowl with which the horizontal as well as the vertical side of the corner contacts.

This bearing is held in an undercut groove 24 provided in the underside of the cover.

As before described contact of the bowl-edge with the bearing is maintained by use of the adjusting sleeve 17.

The operator in handling the meat stands in front of the bowl and the absence of any intervening frame parts in front of the bowl is obviously quite an advantage since it requires less reach and permits close approach to the work.

Occasional contact with the bowl is of no consequence since the speed of its rotation is rather slow. The position of the operator is rendered however secure and still more convenient by the provision of a knee rest 25 against which he may brace himself and which also acts as a guard by protecting him from coming in contact with the driving mechanism of the bowl shaft.

This member 25 is connected to the machine frame in any manner most suitable under existing conditions.

For instance it may be provided with two arms 26 for connection to the frame.

Having described my invention I claim as new:

1. In a meat-cutting machine the combination of a circular bowl to contain the meat to be cut, a general machine frame on which it is supported for rotation in a horizontal plane, a rotary cutter-head to reduce the meat while contained in the bowl, a cover for the bowl secured to the frame mentioned and provided with an undercut groove in its underside and above the corner of the bowl and a strip of soft metal secured in this groove and projecting below the same where it is provided with an angular recess on its underside in which the corner of the bowl travels and with the sides of which recess the horizontal as well as the vertical side of the corner contacts to prevent leakage between the upper edge of the bowl and the cover above it.

2. In a meat-cutting machine, the combination of a circular bowl to contain the meat to be cut, a cover for the same, an upright shaft connected at its upper end to the underside of the bowl for rotating the same in a horizontal plane, a vertically movable adjusting sleeve which supports the bowl and forms a bearing for this upright shaft and whereby the bowl may be vertically adjusted to maintain its upper edge in proper relation with reference to the underside of the cover and a bearing for the adjusting sleeve to which it is fitted with a screw connection.

3. In a meat-cutting machine the combination of a bowl, a cutter-head, a general machine frame, legs upon which this frame rests, an upright shaft upon the upper end of which the bowl is supported for rotation, a frame-member extending transversely below the bowl and provided with a bearing for supporting this shaft, mechanism for actuating this upright shaft and a guard connected to this transverse frame-member and extending therefrom to form a guard for shielding the operator against the shaft driving mechanism.

4. In a meat-cutting machine, the combination of a circular bowl adapted to contain the meat to be cut, a general frame for the machine, a cover for the bowl rigidly connected to the frame, a cutter-head comprising a series of spaced knives supported above the cover which latter is provided with an opening through which the cutter-head extends into the bowl so as to operate therein, spaced shoulders on the upper side of the cover extending across the same and along the edges of the opening therein, a comb slidingly fitted between these shoulders, a hood to cover that part of the rotating cutter-head which moves above the cover and resting upon the shoulders mentioned, a cap rigidly connected rearwardly of the hood so as to extend across the comb between these shoulders, a hinge whereby this hood is permanently connected to this cap and a set-screw seated in this cap to detachably hold the comb in position between the said shoulders.

In testimony whereof I hereunto affix my signature.

OSCAR C. SCHMIDT.

Copies of this patent may be obtained for five cents each, by addressing the "Commissioner of Patents, Washington, D. C."